US010720027B2

(12) United States Patent
Miyakoshi (10) Patent No.: US 10,720,027 B2
(45) Date of Patent: Jul. 21, 2020

(54) READING DEVICE AND METHOD (71) Applicant: TOSHIBA TEC KABUSHIKI KAISHA, Tokyo (JP)

(72) Inventor: Hidehiko Miyakoshi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/374,506

(22) Filed: Apr. 3, 2019

(65) Prior Publication Data

US 2019/0318588 A1 Oct. 17, 2019

(30) Foreign Application Priority Data

Apr. 12, 2018 (JP) .................................. 2018-076945

(51) Int. Cl.
*G07G 1/00* (2006.01)
*G06T 7/13* (2017.01)
*G06T 7/174* (2017.01)
*G06K 9/20* (2006.01)
*G06K 9/62* (2006.01)
*G06T 11/20* (2006.01)

(52) U.S. Cl.
CPC .......... *G07G 1/0036* (2013.01); *G06K 9/209* (2013.01); *G06K 9/6215* (2013.01); *G06T 7/13* (2017.01); *G06T 7/174* (2017.01); *G06T 11/203* (2013.01); *G06T 2207/10004* (2013.01)

(58) Field of Classification Search
None
See application file for complete search history.

(56) References Cited

U.S. PATENT DOCUMENTS

| 2014/0052555 A1* | 2/2014 | MacIntosh | ........... G07G 1/0036 |
| | | | 705/23 |
| 2015/0193759 A1* | 7/2015 | Fukuda | ................ G06K 9/3241 |
| | | | 705/23 |
| 2019/0065823 A1* | 2/2019 | Srivastava | .............. G06T 7/174 |

FOREIGN PATENT DOCUMENTS

JP 2007158844 A 6/2007

OTHER PUBLICATIONS

Keiji Yanai, The Current State and Future Directions on Generic Object Recognition, Journal of Information Processing Society, vol. 48, No. SIG 16 (CVIM 19), Nov. 2007, pp. 1-24.
Jamie Shotton et al., Semantic Texton Forests for Image Categorization and Segmentation, IEEE Computer Vison and Pattern Recognition, Anchorage, AK, 2008, pp. 1-8.

* cited by examiner

*Primary Examiner* — Vu Nguyen
(74) *Attorney, Agent, or Firm* — Kim & Stewart LLP (57) ABSTRACT

A reading device includes display and an image capturing device to image objects on a checkout counter. A control unit receives a first image including at least one object on the checkout counter, extracts a first object that is closest to the image capturing device in the first image, then displays an image of the first object and a frame around the first object. Generic object recognition is performed on the first object. A second image is received from the image capturing device. The control unit determines whether the first object is still closest to the image capturing device. A second object is extracted from the second image if the first object is no longer closest to the image capturing device and the second object is the one closest to the image capturing device in the second image.

20 Claims, 10 Drawing Sheets

READING DEVICE AND METHOD

CROSS-REFERENCE TO RELATED APPLICATION

This application is based upon and claims the benefit of priority from Japanese Patent Application No. 2018-076945, filed in Apr. 12, 2018, the entire contents of which are incorporated herein by reference.

FIELD

Embodiments described herein relate generally to a reading device and a method.

BACKGROUND

Conventionally, a technology relating to generic object recognition is known to identify an object by photographing the object with an image sensor device, extracting a feature value for the object from the captured image, comparing the extracted feature value to a corresponding feature value of reference images for potential candidate items, and then calculating a degree of similarity between the object and each of the candidate items. In a technology related to product registration processing in retail store sales transactions, a reading device having generic object recognition functions can be used identify an item being registered or at least identifying candidates to assist an operator of the reading device in the identification of an item in the sales registration.

In sales registration processing using generic object recognition, an operator generally takes the commodities being registered from a basket or from the register counter and holds each commodity one by one over an image capturing area for imaging each object individually. Then, if an object is successfully detected within the captured image by the reading device, a generic object recognition processing is performed on the detected object to identify the commodity. Then, the identified commodity is registered in the sales transaction.

In general, it is desired to improve efficiency of the sales registration processing.

DETAILED DESCRIPTION

In accordance with one embodiment, a reading device, comprises a display unit and an image capturing device configured to image objects on a checkout counter from above. A control unit is configured to receive a first image from the image capturing device including at least one object on the checkout counter; extract a first object in the first image that is closest to the image capturing device in the first image; control the display unit to display an image of the first object and a frame around the first object; perform generic object recognition on the first object; receive a second image from the image capturing device and determine whether the first object is still closest to the image capturing device; and extract a second object from the second image if the first object is no longer closest to the image capturing device and the second object is closest to the image capturing device in the second image.

Hereinafter, example embodiments of a reading device and a method sales registration of the present disclosure are described in detail with reference to the accompanying drawings. In the following example embodiments, a reading device used in a supermarket, a convenience store, or the like is described as one example of a reading device of the present disclosure. As an object being identified with the reading device, a commodity sold in the supermarket, the convenience store, or the like is described. However, the present disclosure is not limited to this particular application.

In general, it is desired to improve efficiency of the sales registration processing or the like by photographing an entire basket (or other grouping) of commodities at once or several commodities at once while the commodities are still on the register counter to avoid having to hold each of the items one by one to acquire a separate image of each item in the sales transaction.

Figure 1:
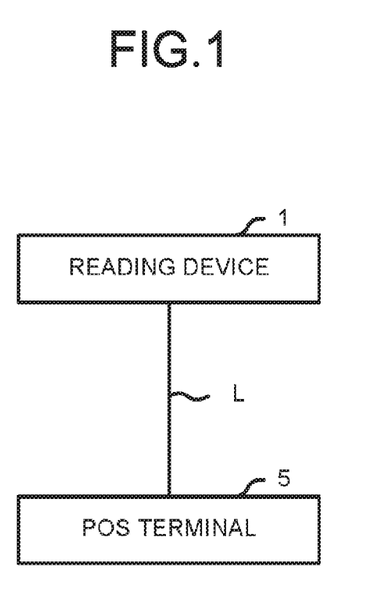
FIG. 1 is a system level diagram illustrating a POS system according to an embodiment.

FIG. 1 is a diagram illustrating an overall configuration of a POS (point of sale) system including a reading device according to an embodiment. The POS system includes a reading device 1 and a POS terminal 5.

The reading device 1 captures an image of a commodity that a customer is purchasing using a camera. The reading device 1 acquires commodity information for the commodity according to an identification process. Sales registration processing is performed on the basis of the commodity identification. In the sales registration processing a commodity code for the commodity being sold is acquired, and commodity information (e.g., commodity name, price, etc.) read from a commodity master file is displayed based on the commodity code. The commodity information for items in the sales transaction is stored in a commodity information section 131 (refer to FIG. 4). Once the sales registration processing has been carried out for all the commodities in the sales transaction, the reading device 1 transmits the commodity information to the POS terminal 5 for settlement processing or the like.

The reading device 1 performs generic object recognition based on the captured image of the commodity. The generic object recognition is a process of recognizing a category of a target object from image data obtained from an image of the target object captured by a camera. A computer (e.g., control section 100 in FIG. 4) extracts a feature value corresponding an appearance of the object from the image data. Then, based on the extracted feature value, the computer calculates a degree of similarity by comparing the extracted feature value to reference feature value data. The feature value data has generally been previously extracted from reference images of known, or expected, candidate commodities of the photographed commodity. The feature value data can be registered in a recognition dictionary file. Particular candidates can be identified in reference commodities based on the calculated degrees of similarity. For example, the reference commodity having the highest degree of similarity may be identified as corresponding to the commodity or multiple candidates, each exceeding some threshold degree of similarity, can be identified in the reference commodities. The technology for recognizing an object included in an image is explained in the following document:

Keiji Yanai, "The Current State and Future Directions on Generic Object Recognition", The Transactions of the Information Processing Society, Vol. 48, No. SIG16 [Retrieved on Aug. 10, 2010], Internet <URL:http://mm.cs.uec.ac.jp/IPSJ-TCVIM-Yanai.pdf>

Furthermore, the technology for performing generic object recognition by dividing an image into different areas for respective objects is explained in the following document:

Jamie Shotton et al., "Semantic Texton Forests for Image Categorization and Segmentation".

The POS terminal 5 has a settlement function and executes a settlement processing relating to each transaction based on the commodity information received from the reading device 1. The settlement processing is a processing of displaying a total amount relating to the transaction based on the commodity information received from the reading device 1, calculating and displaying a change amount due based on a deposited amount tendered by the customer, and dispensing the change due. The POS terminal 5 issues a transaction receipt.

Figure 2:
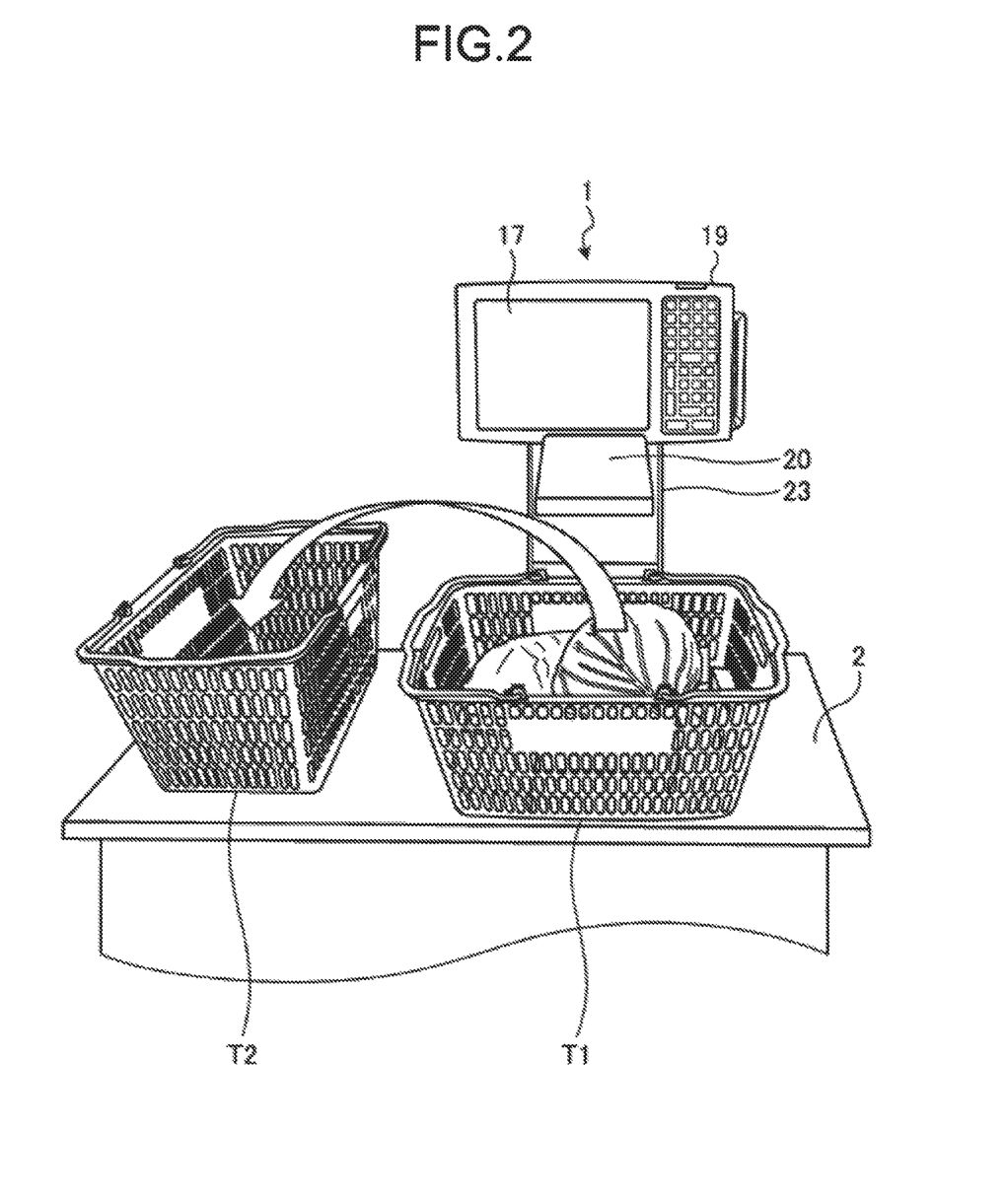
FIG. 2 is an external view depicting an image capturing section provided in a reading device.

FIG. 2 is an external view of the reading device 1. As shown in FIG. 2, the reading device 1 is installed on an upper surface of a bagging platform 2. The bagging platform 2 may also be referred to as a checkout counter 2 in some contexts. A shopping basket or individual commodities are placed on an upper surface of the bagging platform 2. The reading device 1 is provided with a display section 17 at an upper end of a flat support section 23. The display section 17 is used by a store clerk or the like in the registration processing. The flat support section 23 is positioned near the middle of the bagging platform 2. The reading device 1 is provided with an operation section 19 including a keypad on the right side of the display section 17. A display section 18 (refer to FIG. 4) is on the backside of the display section 17 so as to face a customer.

The reading device 1 includes an image capturing section 20 which incorporates an image capturing device at a position below the display section 17 but above the bagging platform 2. The image capturing section 20 is arranged to be capable of photographing a central position on the bagging platform 2 from above. The reading device 1 is capable of photographing a whole basket T1 from above when the basket T1 is placed at the appropriate position on the bagging platform 2. In other words, the image capturing section 20 is capable of photographing items still in the basket T1 before each item has been separately removed from the basket T1 and transferred to basket T2. In this way, when the inside of the basket T1 is photographed by the image capturing section 20, at least the items at an uppermost level within the basket T1 can be photographed when the camera view is not blocked by the other items in the basket T1. Some items in the basket T1 may be temporarily hidden from view of the camera by the presence of other items on top of items below.

In the present embodiment, image capturing section 20 has a time-of-light (TOF) function. The image capturing section 20 may incorporate a time-of-flight (TOF) camera. For example, a TOF camera projects infrared rays subjected to frequency modulation and emitted from infrared LEDs (Light Emitting Diode) arranged in an array and measures a phase of a modulated signal reflected from the target object (object) in its field of view, thereby measuring a distance to the object. In this context, a TOF camera is an image capturing module capable of acquiring distance information in real time. The POS system 1 of the present embodiment acquires distance information indicating the distance between the image capturing section 20 and a commodity in the basket T1 using the TOF camera. Based on the acquired distance information, the uppermost commodity in the basket T1, i.e., the commodity closest to the image capturing section 20 can be selected for identification purposes. The image capturing section 20 outputs data of the captured image along with the distance information at a predetermined time interval (for example, once per second).

The store clerk takes a commodity from uppermost position in basket T1 after it has been identified (registered) and puts it in a basket T2. Once the store clerk has removed all the commodities from the basket T1 and presses a termination key 191 (refer to FIG. 4), the commodity information for the items in the sales registration processing is transmitted to the POS terminal 5.

Figure 3:
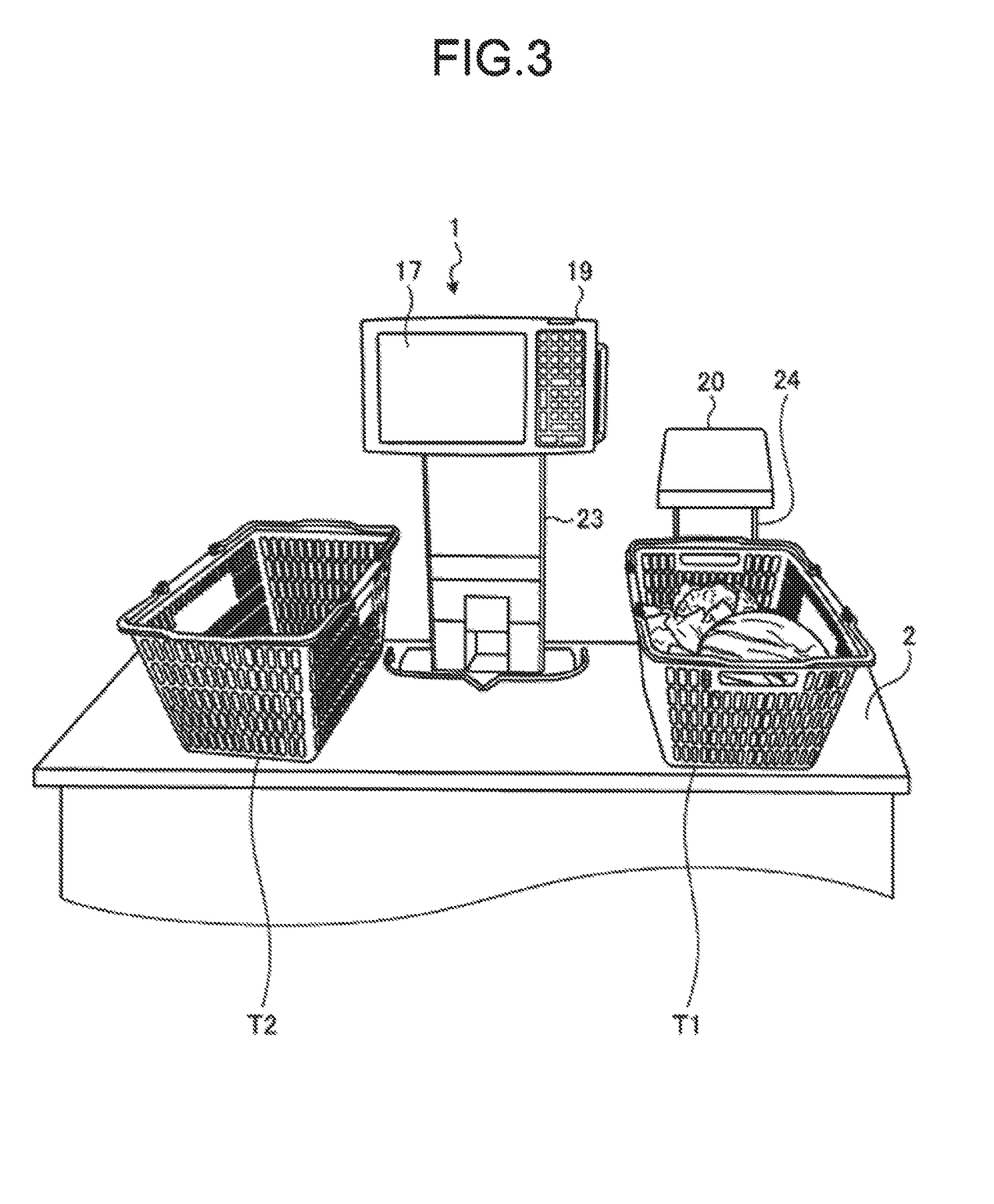
FIG. 3 is an external view depicting an image capturing section provided separately member from a reading device.

In some examples, the image capturing section 20 may be provided in a different support section than the support section 23. FIG. 3 is an external view when the image capturing section 20 is provided on a support section 24 that is different from the support section 23. As shown in FIG. 3, in the reading device 1, the support section 24 is separately provided on the right side of the support section 23, and the image capturing section 20 is provided on the support section 24. The image capturing section 20 in FIG. 3 is still capable of photographing the whole of the basket T1 placed on the bagging platform 2 from above. However, the camera view of the image capturing section 20 coves the right side of the bagging platform 2 rather than a central position of the bagging platform 2.

Figure 4:
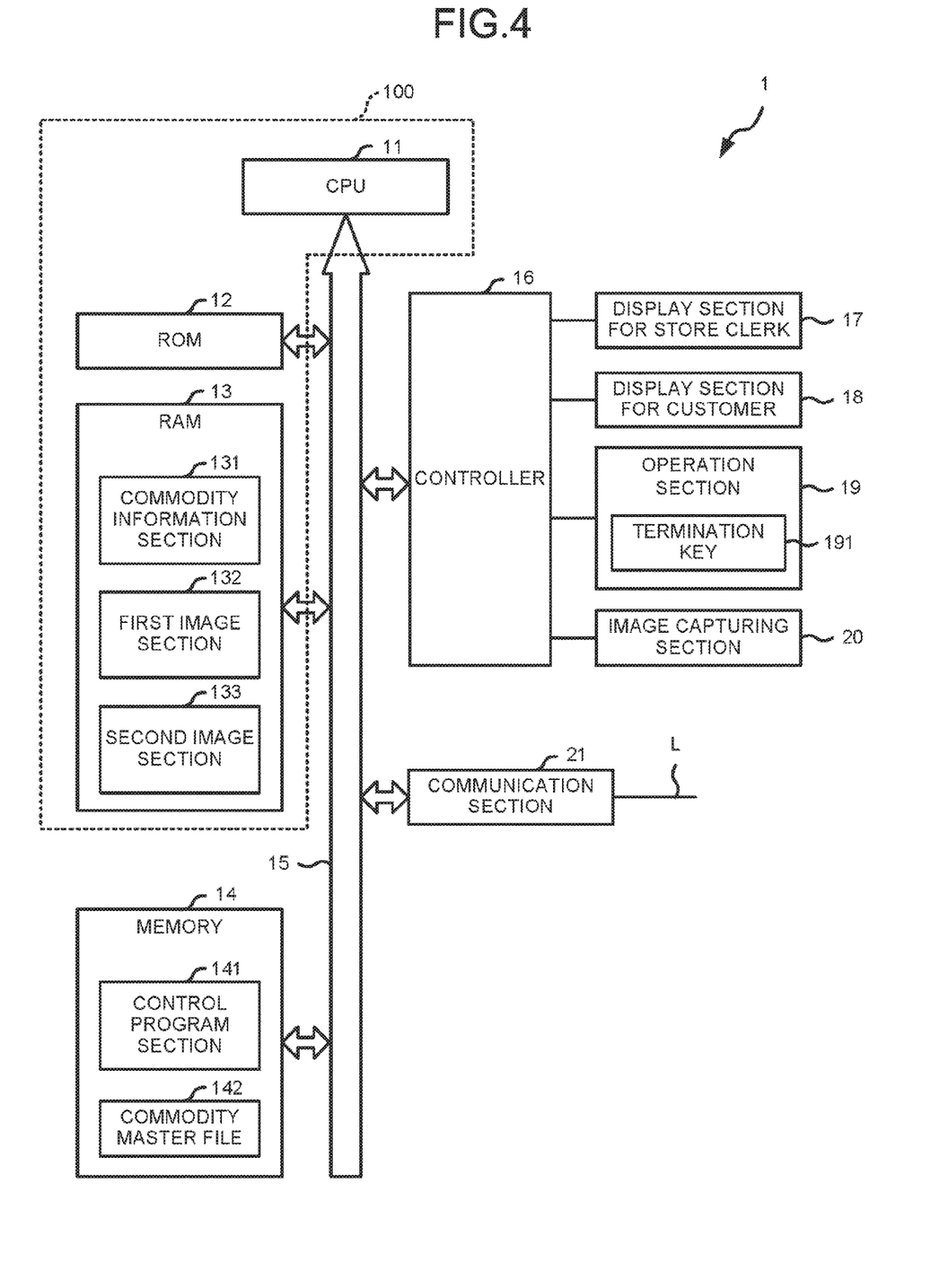
FIG. 4 is a block diagram illustrating a hardware configuration of a reading device.

Next, the hardware configuration of the reading device 1 is described. FIG. 4 is a block diagram illustrating the hardware configuration of the reading device 1. As shown in FIG. 4, the reading device 1 includes a CPU (Central Processing Unit) 11, a ROM (Read Only Memory) 12, a RAM (Random Access Memory) 13, a memory device 14 and the like. The CPU 11 is a main control portion. The ROM 12 stores various programs. The RAM 13 temporarily stores programs and various kinds of data. The memory device 14 stores various programs. The CPU 11, the ROM 12, the RAM 13, and the memory device 14 are connected to each other via a bus 15. The CPU 11, the ROM 12, and the RAM 13 constitute the control section 100 also referred to as a control unit 100. Specifically, the CPU 11 executes a control program stored in the ROM 12 or the memory device 14 and loaded to the RAM 13, and in this way, the control section 100 executes a control processing for the reading device 1.

The RAM 13 includes a commodity information section 131, a first image section 132, and a second image section 133. The commodity information section 131 stores the commodity information for the commodity on which the sales registration processing is being performed based on the captured image from the image capturing section 20. The first image section 132 stores an captured image in a transaction. The second image section 133 stores another image captured image captured after the prior captured image (and stored in the first image section 132). The first image section 132 also stores the captured images transferred from the second image section 133 when the next image is captured and stored in the second image section 133.

The memory device 14 is a nonvolatile memory such as an HDD (Hard Disk Drive) or a flash memory that retains storage information even when a power is turned off. The memory device 14 includes a control program section 141 and a commodity master file 142. The control program section 141 stores a control program for controlling the reading device 1. The commodity master file 142 stores the commodity information in association with commodity codes for specifying the commodities.

The control section 100 is connected to the display section 17, the display section 18, the operation section 19, and the image capturing section 20 via the bus 15 and a controller 16. The display section 17 is, for example, a liquid crystal display unit, and displays information to a store clerk who operates the reading device 1. The display section 18 is, for example, a liquid crystal display unit and displays information to a customer. The operation section 19 is a keypad including a termination key 191. The termination key 191 is pressed once the sales registration processing for all the commodities in a particular sales transaction has been completed. When the termination key 191 is pressed, the control section 100 transmits the commodity information stored in the commodity information section 131 to the POS terminal 5.

The control section 100 is connected to a communication section 21 via the bus 15. The communication section 21 is communicably connected to the POS terminal 5 via a communication line L, such as a LAN (Local Area Network) or the like.

Figure 5:
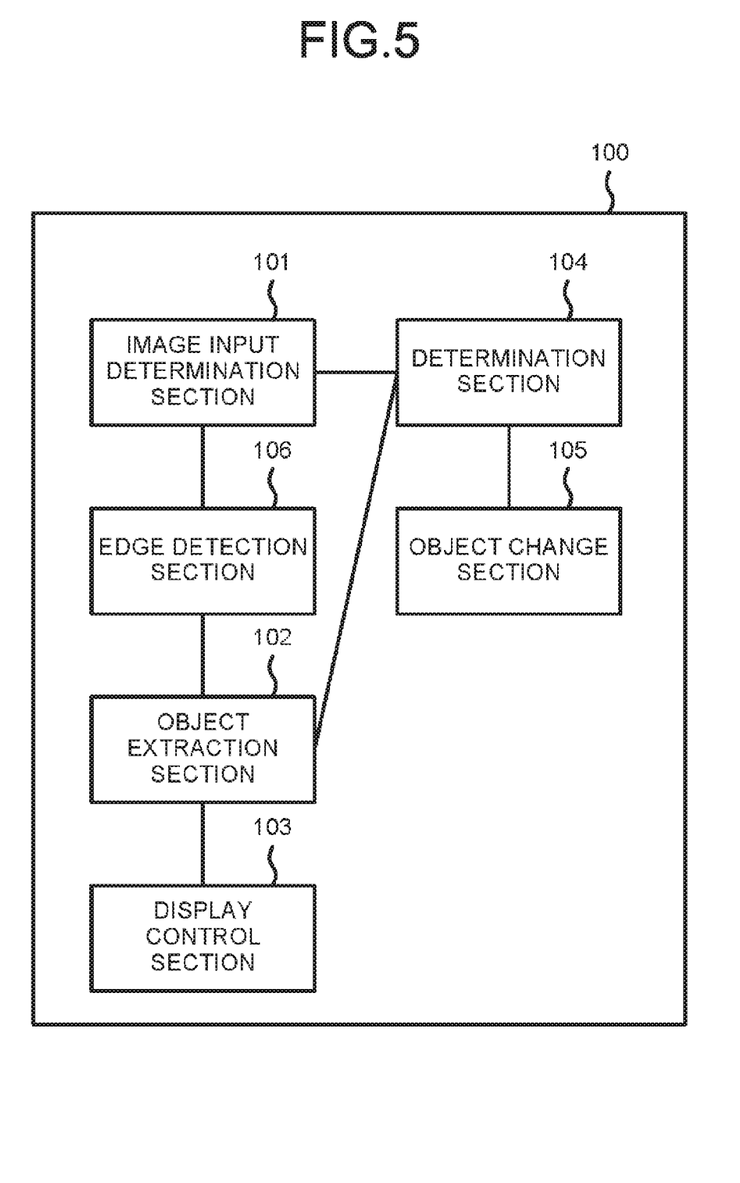
FIG. 5 is a block diagram illustrating functional aspects of a reading device.

FIG. 5 is a block diagram illustrating the functional components of a reading device 1. As shown in FIG. 5, the control section 100 functions as an image input determination section 101, an object extraction section 102, a display control section 103, a determination section 104, an object change section 105, and an edge detection section 106.

The image capturing section 20 photographs the items in the basket T1 from above. The image input determination section 101 determines whether the captured image has been received. The edge detection section 106 detects edges of the items in the captured image. Specifically, the edge detection section 106 detects edges of items using a w technology disclosed in, for example, Japanese Unexamined Patent Application Publication No. 2007-158844. The object extraction section 102 extracts a contour line of an outer periphery of items based on the item edges detected by the edge detection section 106. The object extraction section 102 examines contour lines and extracts those items for which the contour line is complete (no portion of the contour line is missing). Any item for which the contour line is complete can be considered an item at an uppermost position in the basket T1 (that is, no other item is stacked on top of the item in the captured image).

It is also possible to identify the items at an uppermost position using the distance information received from the image capturing section 20 along with captured image information. For example, when the object extraction section 102 identifies a plurality of commodities as at an uppermost position, the one commodity closest to the image capturing section 20 (according to the distance information) is extracted as the commodity at the uppermost position.

The display control section 103 displays an image of the commodity extracted by the object extraction section 102 on the display section 17 in such a manner that the image of the extracted commodity can be visually distinguished from images of other (unextracted) objects.

In general, after the basket T1 has been placed on the bagging platform 2, the customer or the store clerk will rearrange the items in the basket T1. For example, the store clerk rearranges the items so that the items more or less randomly put in the basket T1 by the customer can be more easily taken out from the basket T1. As a result of rearrangement, there is a case in which an item initially at an uppermost position before rearrangement is no longer at an uppermost position. Here, the determination section 104 detects whether the item extracted by the object extraction section 102 was not the one closest to the image capturing section 20 (i.e., not at the uppermost position) in a previously captured image.

Specifically, the determination section 104 compares the item extracted by the object extraction section 102 from on an image captured by the image capturing section 20 before rearrangement (and stored in the first image section 132) with the item extracted by the object extraction section 102 from on an image captured by the image capturing section 20 after the rearrangement (and stored in the second image section 133). The determination section 104 determines whether the item extracted by the object extraction section 102 before and after rearrangement are the same or different. If the commodity extracted by the object extraction section 102 before rearrangement is the same as that extracted by the object extraction section 102 after rearrangement, the determination section 104 determines that the commodity extracted by the object extraction section 102 before rearrangement is still positioned at the uppermost position. If the commodity extracted by the object extraction section 102 before rearrangement is different from that extracted by the object extraction section 102 after rearrangement, the determination section 104 determines that the commodity extracted by the object extraction section 102 before rearrangement is no longer positioned at the uppermost position.

The object change section 105 changes the object extracted by the object extraction section when it is determined that the previously extracted item is not the one closest to the image capturing section 20. In the present embodiment, setting the commodity extracted by the object extraction section 102 after the rearrangement as the commodity at the uppermost position means that the captured image stored in the second image section 133 is transferred to the first image section 132. In other words, by moving the captured image stored in the second image section 133 to the first image section 132, the commodity considered to be at the uppermost position in the captured image stored in the first image section 132 is changed.

Figure 6:
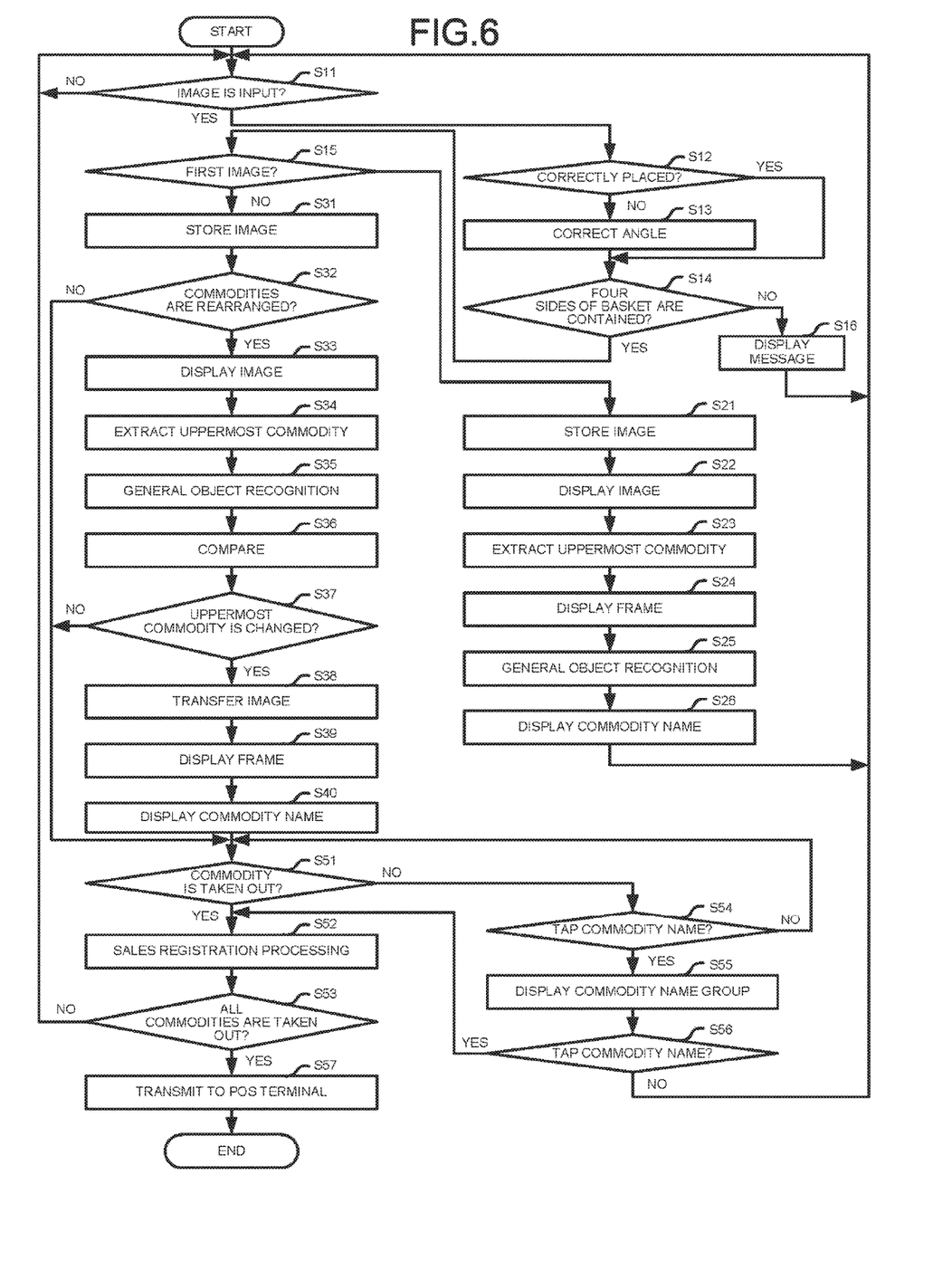
FIG. 6 is a flowchart depicting a flow of a control processing executed by a reading device.

FIG. 6 is a flowchart depicting a flow of the control processing executed by the reading device 1. As shown in FIG. 6, image input determination section 101 determines whether a captured image (captured by the image capturing section 20) has been input (S11). The control section 100 stands by (No in S11) until it is determined that a captured image has been input). Once it is determined that the captured image has been input (Yes in S11), the control section 100 next determines whether the basket T1 placed has been at the correct angle (that is, is parallel to the bagging platform 2) based on the input captured image (S12). If the basket T1 is not placed at the correct angle on the bagging platform 2, the display section 17 indicates the basket T1 is in an inclined (tilted) state. In this case, since the basket T1 may be jostled when the store clerk takes commodities from the basket T1, S12 may be repeated again. When the basket T1 is placed on the bagging platform 2, if one side of the basket T1 is substantially parallel to a side of the bagging platform 2, the control section 100 can determine that the basket T1 is placed at the correct angle. On the other hand, if one side of the basket T1 is not substantially parallel to the side of the bagging platform 2 (i.e., is inclined), the control section 100 determines that the basket T1 is not placed at the correct angle.

If it is determined that the basket T1 has not been placed at the correct angle (No in S12), the control section 100 automatically corrects the angle of the basket T1 in the image displayed on the display section 17, and then displays the basket T1 in a state in which the basket T1 is at the correct angle (S13). Next, the control section 100 determines whether all four sides (edges) of the basket T1 are displayed on the display section 17 (S14). If all the four sides of the basket T1 are not displayed on the display section 17, there is a possibility that the placement position of the basket T1 on the bagging platform 2 is incorrect, and, if so, all the items the basket T1 might not be photographed. Therefore, if it is determined that all the four sides (edges) of the basket T1 are not displayed on the display section 17 (No in S14), the control section 100 displays a message on the display section 17 and/or the display section for customer 18 instructing the placing of the basket T1 at the correct position (S16). Then, the control section 100 returns to the processing in S11. Once it is determined in S12 that the basket T1 is placed at the correct angle (Yes in S12), the control section 100 executes the processing in S14 without executing the processing in S13.

If it is determined that all the four sides (edges) of the basket T1 are displayed on the display section 17 (Yes in S14), the image input determination section 101 next determines whether the just input captured image is the first captured image in the transaction (S15). If a captured image is not already stored in the first image section 132, the image input determination section 101 determines that the input captured image is the first captured image in the transaction.

If it is determined that the input captured image is the first captured image in one transaction (Yes in S15), the control section 100 stores the input captured image in the first image section 132 (S21). The control section 100 then displays the captured image stored in the first image section 132 on the display section 17 (S22).

Next, the edge detection section 106 detects edges of the commodities appearing in the captured image stored in the first image section 132. The object extraction section 102 then extracts the contour lines of the commodities based on the detected edges. Subsequently, the object extraction section 102 extracts a commodity for which the extracted contour line is continuous (no missing portions) as the commodity at the uppermost position among the commodities in the basket T1 (S23).

Next, the control section 100 displays a frame surrounding the commodity considered to be at the uppermost position as extracted by the object extraction section 102 (S24). The store clerk can visually distinguish that the commodity surrounded by the frame is considered the commodity at the uppermost position by noticing the frame surrounding the commodity in the display image of display section 17. Next, the control section 100 performs generic object recognition on the commodity extracted by the object extraction section 102 to extract a reference commodity most similar to the commodity (S25). The control section 100 displays the commodity name of the extracted reference commodity (S26). Then, the control section 100 returns to the processing in S11.

Figure 7:
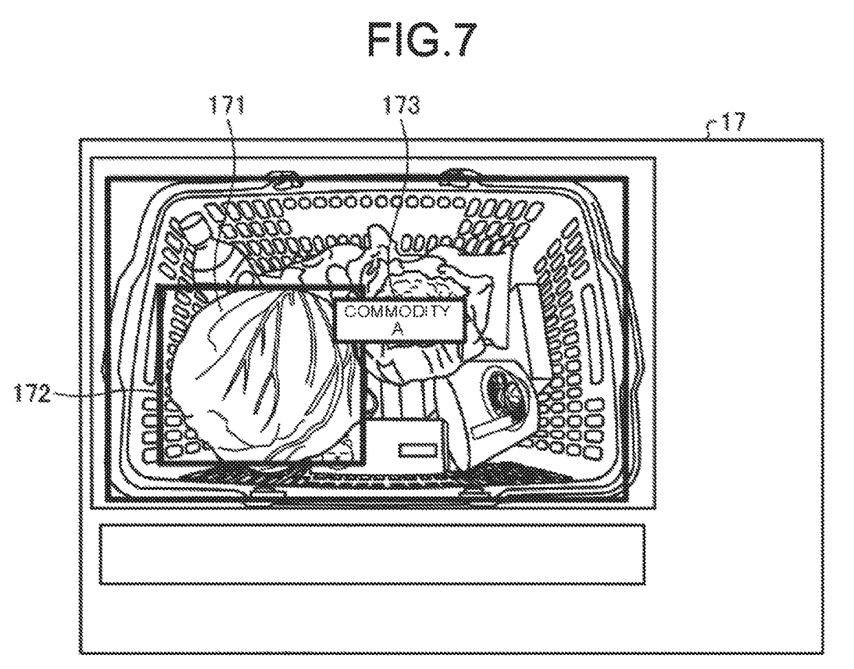
FIG. 7 depicts a display example of a display section.
Figure 8:
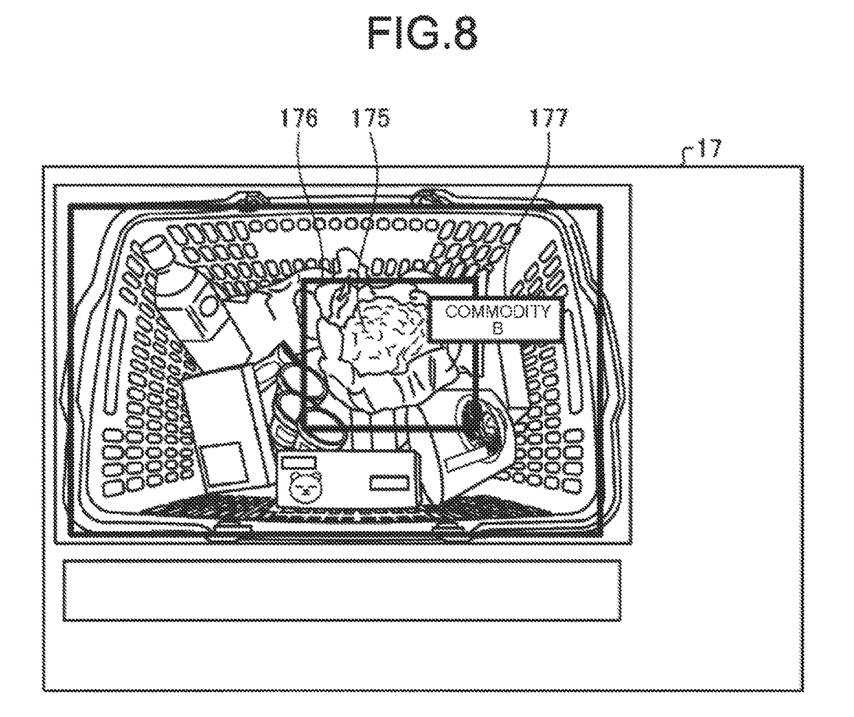
FIG. 8 depicts another display example of a display section.

FIG. 7 is a diagram illustrating an image of the commodity whose name ("Commodity A") has been displayed (in S26) on the display section 17. In FIG. 7, the commodity 171 at the uppermost position is surrounded by a frame 172 (displayed in S24). A color of the frame 172 is, for example, red for visual emphasis. At a position relating to the image of the commodity at the uppermost position, a commodity name 173 ("Commodity A") corresponding to the reference commodity deemed most similar to the extracted commodity (commodity 171) is displayed. The store clerk watches the display of the commodity name 173 to check that the commodity at the uppermost position (which is surrounded by the frame 172) matches to commodity A.

If it is determined in S15 that the just input captured image is not the first captured image in a transaction (No in S15), the control section 100 stores the input captured image in the second image section 133 (S31). Next, the control section 100 (or rearrangement determination section thereof) determines whether the commodities in the basket T1 have been rearranged (S32). The control section 100 compares the captured image stored in the first image section 132 (in S21) with the captured image just stored in the second image section 133 (in S31). It is determined whether the commodities in the basket T1 have been rearranged by determining whether the positions of the commodities in both captured images (first and second) are coincident or different, for example, by using a well-known background difference method. In the captured image stored in the first image section 132 and in the captured image stored in the second image section 133, if the positions of all the commodities are coincident, it is determined that the commodities in the basket T1 have not been rearranged. If the positions of at least some commodities in the images are not coincident, it is determined that the commodities in the basket T1 have been rearranged.

If it is determined that the commodities in the basket T1 have been rearranged (Yes in S32), the control section 100 displays the captured image stored in the second image section 133 on the display section 17 (S33). Then, similarly to the processing in S23, the edge detection section 106 detects the edges of the commodities and the object extraction section 102 extracts the contour lines of the commodities to identify the commodity at the uppermost position among the commodities in the basket T1 (S34). Next, the control section 100 performs the generic object recognition on the commodity deemed to be at the uppermost position to extract a reference commodity most similar to this uppermost commodity (S35).

Next, the determination section 104 compares the reference commodity extracted in S25 with the reference commodity extracted in S35 (S36). The determination section 104 determines whether the reference commodity extracted in S25 is different from the reference commodity extracted in S35 (S37). In other words, the determination section 104 determines whether the commodity at the uppermost position in S23 is no longer at the uppermost position as a result of a rearrangement (S37).

If the determination section 104 determines that the commodity extracted by the object extraction section 102 in S23 is no longer at the uppermost position (Yes in S37), the object change section 105 transfers the captured image stored in the second image section 133 to the first image section 132 (S38). In this process, the first captured image previously stored in the first image section 132 is deleted. In other words, in S37 the object change section 105 executes changes the commodity that is deemed to be at the uppermost position of the basket T1 from the commodity extracted in S23 to the commodity extracted in S34.

Next, the control section 100 displays a frame surrounding the commodity now considered to be at the uppermost position of the rearranged basket T1 (S39). Then, the control section 100 displays the commodity name of the reference commodity extracted in S35 in association with the commodity (S40).

Next, the control section 100 (or an extraction determination section thereof) determines whether the commodity at the uppermost position has been taken out from the basket T1 (S51). For example, if it is determined that the commodity at the uppermost position is no longer in the basket T1 using a well-known background difference method, the control section 100 determines that this commodity has been taken out. If it is determined that the commodity at the uppermost position has been taken out (Yes in S51), the control section 100 executes the sales registration processing for this commodity (S52). Specifically, the control section 100 performs the sales registration processing using the commodity information related to the reference commodity having the highest degree of similarity to the commodity that has been taken out.

Next, the control section 100 determines whether all commodities have been taken out from the basket T1 (S53). If no commodity appears in the captured image from the image capturing section 20, the control section 100 determines that all the commodities have been taken out. If it is determined that all the commodities have been taken out (Yes in S53), the control section 100 transmits the commodity information stored in the commodity information section 131 to the POS terminal 5 if the termination key 191 is operated (S57). Then, the control section 100 then clears the information stored in the commodity information section 131, the first image section 132, and the second image section 133 for the next transaction. The control section 100 then terminates the processing. If it is determined that not all the commodities have been taken out (No in S53), the control section 100 returns to the processing in S11.

On the other hand, if it is determined that the commodity at the uppermost position was not yet taken out (No in S51), the control section 100 determines whether the commodity name displayed in S26 or S40 has been tapped (S54). If it is determined by the store clerk or the like that the commodity name displayed in S26 or S40 does not match the commodity surrounded by the frame (the commodity at the uppermost position), the store clerk taps the display to display another commodity name other than the presently displayed commodity name. If it is determined that the commodity name displayed in S26 or S40 has been tapped (Yes in S54), the control section 100 displays a commodity name other than the commodity name previously displayed in S26 or S40 (S55). In S55, the control section 100 displays one or more commodity names of reference commodities having a calculated degree of similarity below that of the commodity name displayed in S26 or S40. The commodity names displayed in S55 may also include the commodity name displayed in S26 or S40. A character or message indicating "other commodities" may be displayed as a commodity name choice displayed in the processing in S55. When the store clerk determines that there is no commodity name matching the framed commodity among the commodity names displayed in S55, the store clerk taps "other commodities" to display more commodity names than displayed so far. The store clerk searches for the commodity name of the commodity from among the displayed commodity names and taps it to select.

Figure 9:
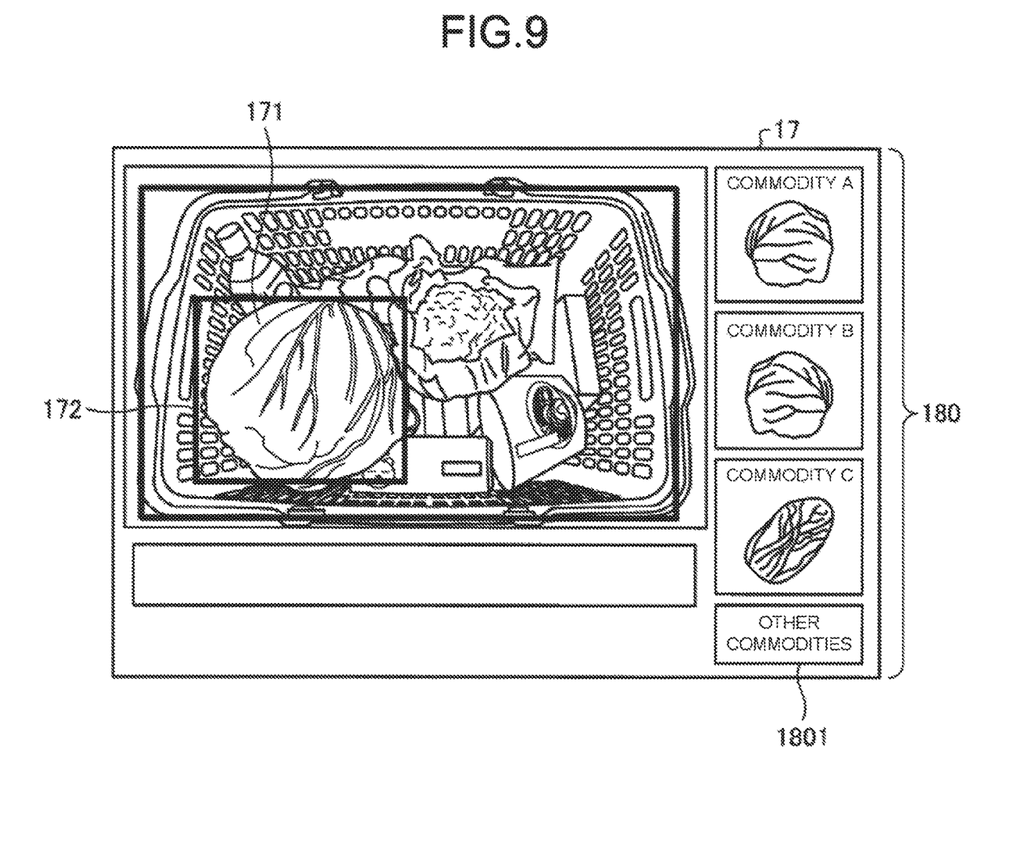
FIG. 9 depicts still another display example of a display section.

FIG. 9 shows an example of a screen displayed in S55. In FIG. 9, a commodity name 173 at the position shown in FIG. 7 has been deleted, and instead images several candidate commodities including a "Commodity B" and a "Commodity C" are displayed in a commodity name region 180. Here, commodity B corresponds to the reference commodity the next highest calculated degree of similarity below that of commodity A. Commodity C is the next most similar reference commodity after commodity B. It is possible that commodity A is actually the correct match to commodity 171 but the store clerk has made a mistake in think the match is faulty. As such, in this example, the commodity name for commodity A is displayed together with the commodity names of commodity B and the commodity C. Also, an "other commodities" option (button 1801) is displayed as one of the choices in the commodity name region 180. If the commodity 171 is none of the presently displayed options in the commodity name region 180, the store clerk would tap the "other commodities" button 1801 to display more commodity names (candidate items).

Next, the control section 100 determines whether any commodity name option has been tapped (S56). If it is determined that a commodity name has been tapped (Yes in S56), the control section 100 executes the processing subsequent to S52 in the same way as described above. If it is determined that no commodity name has been tapped (No in S56), the control section 100 determines that the displayed commodity names do not include the corresponding commodity name, and returns to the processing in S11 to input the captured image of the commodity again.

If it is determined in S54 that no commodity name displayed in S26 or S40 has been tapped (No in S54), the control section 100 returns to the processing in S51 to stand by. If it is determined in S32 that the commodities in the basket T1 has not been rearranged (No in S32), the control section 100 executes the processing subsequent to S51 in the same way as described above. In S37, if it is determined that the commodity at the uppermost position which is extracted by the object extraction section 102 in S23 is still at the uppermost position as a result of rearrangement (No in S37), the processing subsequent to S51 is executed in the same way as described above.

The difference in processing between if the commodities in the basket T1 are rearranged (Yes in S32) and if the commodity at the uppermost position is taken out from the basket T1 (Yes in S51) is described. If the commodities in the basket T1 are rearranged, the positions of many commodities in the basket T1 may change. On the other hand, if the commodity at the uppermost position has been taken out, the commodity disappears and there might be no change in the positions of the other commodities. The control section 100 determines this difference to distinguish the determination in S32 from the determination in S51.

As described above, according to the present embodiment, when a commodity in the basket T1 is rearranged, the commodity deemed to be at the uppermost position can automatically be changed. Therefore, it is possible to improve the efficiency of the sales registration processing.

Further, in the present embodiment, when several commodities are at what could be considered the uppermost position, it is possible to extract a commodity at the uppermost position based on the distance information. Therefore, it is possible to improve the efficiency of the sales registration processing.

Figure 10:
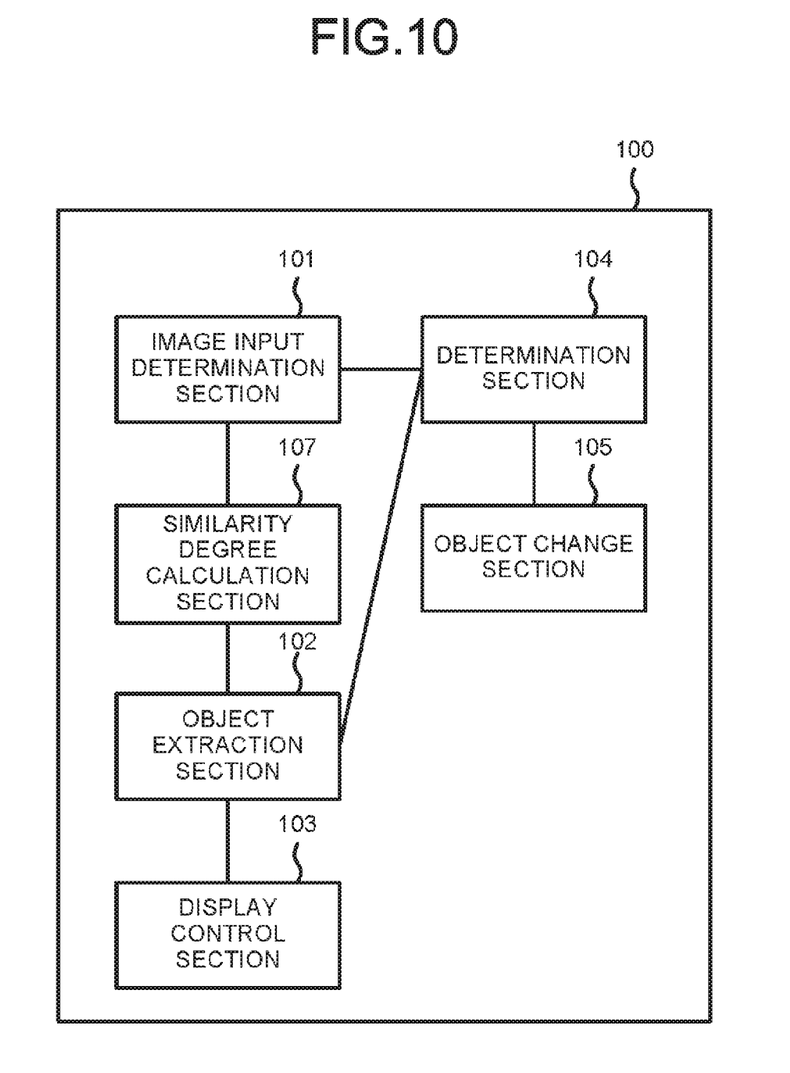
FIG. 10 is a block diagram illustrating functional aspects of a reading device according to one modification.

A modification of the above example embodiment is described below. In the above embodiment, the edges of commodities are detected and a commodity at the uppermost position is extracted based on contour line completeness or measured distances. In the modification, a commodity having the highest calculated similarity degree to a reference commodity is extracted as the commodity at the uppermost position. For the modification, the same components as those in the embodiment are denoted with the same reference numerals, and the description thereof is omitted. FIG. 10 is a functional block diagram relating to the reading device 1 according to the modification. As shown in FIG. 10, the control section 100 includes the image input determination section 101, the object extraction section 102, the display control section 103, the determination section 104, the object change section 105 and a similarity degree calculation section 107. The similarity degree calculation section 107 executes the generic object recognition processing on all the commodities appearing in the captured image of the basket T1 and degree of similarity for each imaged commodity to reference commodities is calculated.

In the captured image, the calculated degree of similarity for a commodity that is hidden behind other commodities will generally not be very high. For a commodity that is not hidden by other commodities (that is, a commodity that can be deemed an uppermost position in the basket T1 since it is not blocked by other commodities), the calculated degree of similarity to a reference commodity can be high. By utilizing this, the object extraction section 102 can extracts the commodity having the highest calculated degree of similarity (as calculated by the similarity degree calculation section 107) as the commodity at the uppermost position.

Figure 11:
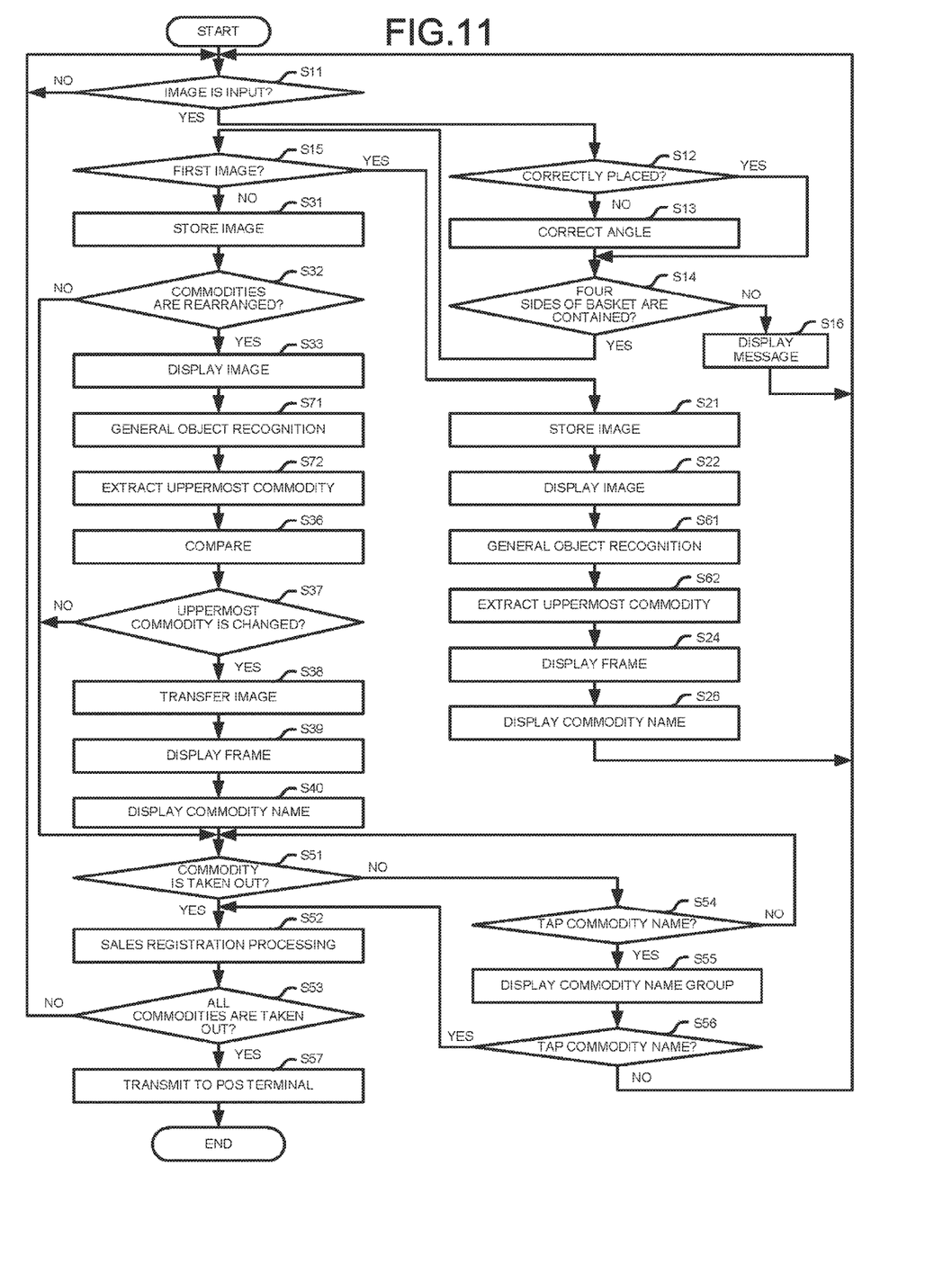
FIG. 11 is a flowchart depicting a flow of a control processing executed by a reading device according to the modification.

Next, the control processing executed by the reading device 1 according to the modification is described. FIG. 11 is a flowchart depicting the flow of the control processing executed by the reading device according to the modification. In FIG. 11, the same processing as in the embodiment is denoted with the same reference numerals as those in FIG. 6. In FIG. 11, after the processing in S22, the control section 100 calculates the degree of similarity by executing the generic object recognition processing for all commodities appearing in the input captured image (S61). Then, the control section 100 extracts the commodity having the highest calculated degree of similarity as the commodity at the uppermost position (S62). After that, the processing subsequent to S24 is executed in the same way as described above in conjunction with FIG. 6.

After the processing in S33, the control section 100 calculates the degree of similarity by executing the generic object recognition processing for all commodities appearing in the captured image (S71). Then, the control section 100 extracts the commodity having the highest calculated degree of similarity as the commodity at the uppermost position (S72). After that, the processing subsequent to S36 is executed in the same way as described above.

In such a modification, when the commodities in the basket T1 is rearranged, the commodity at the uppermost position can also automatically be changed as well. Therefore, it is possible to improve the efficiency of the sales registration processing.

In the modification, when there is a plurality of commodities considered to be at the uppermost position, the commodity at the uppermost position can be extracted based on the distance information. Therefore, it is possible to improve the efficiency of the sales registration processing.

Additional modifications of the above embodiments are contemplated. For example, in the above described embodiment the commodity names 173 and 177 are displayed to partially cover portions of the commodities 171 and 175 and the frames 172 and 176, respectively. However, the present disclosure is not limited to this. For example, the commodity names 173 and 177 may be positioned to cover only the commodities 171 and 175, respectively, or portions of the frames 172 and 176, respectively.

The programs executed by the reading device 1 of these embodiments may be recorded in a non-transitory computer-readable recording medium such as a CD-ROM (compact disc read-only memory), a FD (Flexible Disk), a CD-R (Compact Disc Rewritable), a DVD (Digital Versatile Disk) and the like in the form of installable or executable file to be provided.

Further, the programs executed by reading device 1 of the embodiment and the modification can be stored in a computer connected via a network such as Internet, and may be downloaded via the network for execution. Likewise, the programs executed by reading device 1 of these embodiments and the modifications thereto may be distributed across a network such as the Internet.

The programs executed by reading device 1 of the embodiment and the modification may be provided by being incorporated into ROM.

While certain embodiments and modifications have been described, these embodiments and modifications have been presented by way of example only, and are not intended to limit the scope of the present disclosure. Indeed, the novel embodiments and modifications described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A reading device, comprising:
a display unit;
an image capturing device configured to image objects on a checkout counter from above; and
a control unit configured to:
  receive a first image from the image capturing device including at least one object on the checkout counter;
  extract a first object in the first image that is closest to the image capturing device in the first image;
  control the display unit to display an image of the first object and a frame around the first object;
  perform generic object recognition on the first object;
  receive a second image from the image capturing device and determine whether the first object is still closest to the image capturing device; and
  extract a second object from the second image if the first object is no longer closest to the image capturing device, and the second object is closest to the image capturing device in the second image.

2. The reading device according to claim 1, wherein the image capturing device includes a time-of-flight camera configured to provide distance information indicating a distance from an object to the image capturing device, and the control unit is configured to use the distance information to identify an object closest to the image capturing device.

3. The reading device according to claim 1, wherein the objects on the checkout counter are in a basket and the image capturing device is positioned to include at least one outer edge of the basket in captured images.

4. The reading device according to claim 1, further comprising:
a memory unit comprising a first image section and a second image section, wherein
the control unit is configured to store the first image in the first image section and the second image in the second image section and to determine whether objects in the first image are rearranged in the second image.

5. The reading device according to claim 1, wherein the control unit is further configured to detect edges of objects in a captured image and to determine an object having complete outer contour lines based on its detected edges is the object closest to the image capturing device.

6. The reading device according to claim 1, wherein the control unit is further configured to display a commodity name on the display screen proximate to the first object in the first image based on the generic object recognition.

7. The reading device according to claim 6, wherein the control unit is further configured to register the first object as an item in a sales transaction according to the commodity name if the first object is detected as removed beyond the field of view of the imaging capturing device.

8. The reading device according to claim 1, wherein the control unit is further configured to display a plurality of candidate commodity names on the display based on a calculated degree of similarity to the first object from the generic object recognition.

9. A commodity checkout apparatus for a retail store, comprising:
a checkout counter having a first region and a second region;
a display unit mounted on the checkout counter;
an image capturing device configured to image the first region of the checkout counter from above; and
a control unit configured to:
receive a first image from the image capturing device including a plurality of objects on the checkout counter;
extract a first object from the plurality of object in the first image, the first object being determined as closest to the image capturing device in the first image by the control unit;
control the display unit to display the first image with a frame highlighting the first object;
perform generic object recognition on the first object;
receive a second image from the image capturing device including the plurality of object on the checkout counter and determine whether the first object is still closest to the image capturing device;
extract a second object from the second image if the first object is no longer closest to the image capturing device and the second object is closest to the image capturing device in the second image; and
control the display unit to display the second image with a frame highlighting the second object if the first object is no longer closest to the image capturing device.

10. The checkout apparatus according to claim 9, wherein the first region of the checkout counter is sized to accommodate a shopping basket available at the retail store.

11. The checkout apparatus according to claim 10, wherein the control unit is further configured to check whether the shopping basket is appropriately placed in the first region before receiving the first image from the image capturing device.

12. The checkout apparatus according to claim 9, wherein
the image capturing device includes a time-of-flight camera configured to provide distance information indicating a distance from an object to the image capturing device, and
the control unit is configured to use the distance information to determine which object in the plurality of objects is closest to the image capturing device.

13. The checkout apparatus according to claim 9, wherein the control unit is further configured to detect edges of the plurality of objects in a captured image and to determine an object having complete outer contour lines based on its detected edges is the object closest to the image capturing device.

14. The checkout apparatus according to claim 9, wherein the control unit is further configured to display a commodity name on the display screen proximate to the first object in the first image based on the generic object recognition.

15. The checkout apparatus according to claim 14, wherein the control unit is further configured to register the first object as an item in a sales transaction according to the commodity name if the first object is detected as removed from the first region.

16. The checkout apparatus according to claim 9, wherein the control unit is further configured to display a plurality of candidate commodity names on the display based on a calculated degree of similarity to the first object from the generic object recognition.

17. A method registering items in a sales transaction, the method, comprising:
receiving a first image from an image capturing device including a plurality of objects on a checkout counter;
extracting a first object from the plurality of object in the first image, the first object being the object closest to the image capturing device in the first image;
controlling a display unit to display the first image with a frame highlighting the first object;
performing generic object recognition on the first object;
receiving a second image from the image capturing device including the plurality of object on the checkout counter and determining whether the first object is still closest to the image capturing device;
extracting a second object from the second image if the first object is no longer closest to the image capturing device, the second object being the object closest to the image capturing device in the second image; and
controlling the display unit to display the second image with a frame highlighting the second object if the first object is no longer closest to the image capturing device.

18. The method according to claim 17, wherein
the image capturing device includes a time-of-flight camera configured to provide distance information indicating a distance from an object to the image capturing device, and
the distance information is used to determine which object is closest to the image capturing device.

19. The method according to claim 17, wherein the plurality of objects on the checkout counter are in a basket and the imaging device is positioned to include at least one outer edge of the basket in captured images.

20. The method according to claim 17, further comprising:
   displaying a commodity name on the display screen based on the generic object recognition.

* * * * *